United States Patent [19]

Grubba

[11] 4,141,743
[45] Feb. 27, 1979

[54] THERMAL SPRAY POWDERED COMPOSITE

[75] Inventor: Donald C. Grubba, Westboro, Mass.

[73] Assignee: Dresser Industries, Inc., Dallas, Tex.

[21] Appl. No.: 846,855

[22] Filed: Oct. 31, 1977

[51] Int. Cl.$^2$ .................. C04B 35/10; C04B 35/12
[52] U.S. Cl. .................................... 106/66; 106/57;
106/59; 106/60; 106/62; 106/63; 106/67;
106/68; 106/69; 106/73.33; 417/DIG. 1;
417/900
[58] Field of Search ............... 106/66, 59, 48, 73.33;
417/DIG. 1, 900

[56] References Cited

U.S. PATENT DOCUMENTS

| 128,635 | /1872 | Kitchin | 417/DIG. 1 |
|---|---|---|---|
| 3,080,135 | 3/1963 | Steijn | 106/66 |
| 3,330,704 | 7/1967 | Michaels | 106/66 |
| 3,582,374 | 6/1971 | Bonar | 106/66 |
| 3,625,717 | 12/1971 | Grubba et al. | 106/73.33 |

*Primary Examiner*—Helen McCarthy
*Attorney, Agent, or Firm*—Raymond T. Majesko; John N. Hazelwood

[57] ABSTRACT

A composite powder suitable for use in thermal spray applications as a wear and/or corrosion resistant coating comprising chromic oxide, magnesium oxide, iron oxide, titanium oxide, and aluminum oxide.

7 Claims, No Drawings

THERMAL SPRAY POWDERED COMPOSITE

Chromic oxide or chromic oxide-rich thermal spray coatings are widely used in industry to improve the wear and/or corrosion resistance of metal parts. At present, these coatings are applied using either 95%, or higher, pure chromic oxide powder, or powders which are a mixture of chromic oxide and aluminum oxide, or of chromic oxide and some similar refractory oxide with chromic oxide as the major constituent.

These materials, while effective, are very costly. Their melting points are very high and the coatings obtained are very brittle. These coatings also may be more porous than is desirable for some applications. The presently available coatings are difficult to finish by grinding or other machining processes due to their extremely brittle nature which engenders a strong tendency toward chipping. Finishing is of necessity then, a slow and costly process.

Accordingly, it is an object of the present invention to provide a thermal spray powder that will impart a high degree of wear and abrasion resistance.

It is another object of the invention to provide materials that will impart an essentially non-porous, highly effective corrosion resistant coating.

Still another object is to provide a coating that is less brittle than conventional coatings and thus less apt to chip in service, and which may be finished by grinding, or by other machining means with reasonable ease and at a reasonable cost.

In accordance with the present invention, there is provided a complexed composite powder comprising by weight, from about 40% to 50% $Cr_2O_3$, about 1 to 10% $MgO$, about 2 to 10% $Fe_2O_3$, about 1 to 10% $TiO_2$ and about 5 to 40% $Al_2O_3$.

If desired, there may be added, up to 1% $ZrO_2$, up to 2% $CaO$, and up to 8% $SiO_2$.

In a preferred embodiment, the composition comprises about 42% to 46% $Cr_2O_3$, about 7 to 10% $MgO$, about 8 to 10% $Fe_2O_3$, about 4 to 7% $TiO_2$, and about 28% to 32% $Al_2O_3$. As to the other ingredients, the preferred range is up to 0.5% $ZrO_2$, up to about 0.5% $CaO$, and up to about 5% $SiO_2$.

While the thermal spray powders currently available provide a refractory coating, the powders of the present invention provide a coating which contains a significant glassy phase. Since these powders have a lower melting point and do include a glassy phase, the materials flow more readily upon the substrate and produce a coating which includes very few pores.

An important advantage provided by the powders of this invention is decreased rebound loss. This means that a higher percentage of the powder sprayed is actually deposited upon the substrate.

The lower melting point and higher flowability of the powders of this invention enable it to be applied at faster rates than can be achieved with conventional powders.

The raw materials used to prepare these complexed thermal spray powders including ore grade materials, clays and metal oxides. Many suitable materials are commercially available. These materials are easily proportioned in accordance with their various oxide compositions to obtain composite formulations which satisfy the stated oxide formula ranges.

When the raw materials have been proportioned to obtain the desired composite analysis, they are combined and blended in a high speed mixer to obtain a homogeneous mixture. The blended oxide materials are then sintered in a furnace to obtain the stable reacted chromic oxide complexed composite. The sintered material is then reduced to a powder of any desired particle size by conventional means.

Several formulations were prepared and tested in the laboratory with satisfactory results being obtained. These formulations are shown in the Table below.

TABLE

| MIX: | 1 | 2 | 3 | 4 |
|---|---|---|---|---|
| $Cr_2O_3$ | 44.0% | 40.0% | 48.0% | 44.0% |
| $ZrO_2$ | 0 | 0 | 0 | 0.3 |
| $MgO$ | 8.0 | 6.0 | 3.0 | 8.1 |
| $CaO$ | 0 | 0 | 0 | 0.1 |
| $Fe_2O_3$ | 8.0 | 10.0 | 9.0 | 10.1 |
| $TiO_2$ | 8.0 | 6.0 | 3.0 | 5.7 |
| $Al_2O_3$ | 28.0 | 33.0 | 35.0 | 30.5 |
| $SiO_2$ | 4.0 | 5.0 | 2.0 | 1.2 |

Plasma spray tests conducted using these formulations all produced coatings having Rockwell 15N hardness readings in the range of 84 to 87. This may be compared to readings of about 90 obtained for conventional plasma spray coatings containing chromic oxide. All of the formulations of the present invention had rebound losses in the range of 45 to 50%. This may be compared to rebound losses in the range of 60 to 65% for conventional chromic oxide powders.

Mix 4 constitutes the preferred embodiment of the invention. In laboratory tests, plasma spray coatings made using this material, exhibited a Rockwell hardness reading of 86. Rebound loss was 45%. The No. 4 formulation has been applied as a wear and corrosion resistant material on trash and slurry pumps with good results.

It is intended that the foregoing description and example be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A complexed chromic oxide composite powder consisting essentially of, by weight, about 40% to 50% $Cr_2O_3$, about 1 to 10% $MgO$, about 2 to 10% $Fe_2O_3$, about 1 to 10% $TiO_2$, and about 5 to 40% $Al_2O_3$, and $SiO_2$ in amounts up to about 8%, said powder including a glassy phase and providing a refractory coating which contains a significant glassy phase and has a Rockwell 15N scale hardness reading in the range of about 84 to 87.

2. A composite powder according to claim 1 which contains, in addition, at least one material selected from the group consisting of $ZrO_2$ and $CaO$.

3. A composite powder according to claim 2, in which the $ZrO_2$ is present in amounts up to about 1%.

4. A composite powder according to claim 2, in which the $CaO$ is present in amounts up to about 2%.

5. A complexed chromic oxide composite powder consisting essentially of, by weight, about 42% to 46% $Cr_2O_3$, about 7 to 10% $MgO$, about 8 to 10% $Fe_2O_3$, about 4 to 7% $TiO_2$ and about 28% to 32% $Al_2O_3$, and $SiO_2$ in amounts up to about 5%, said powder including a glassy phase and providing a refractory coating which contains a significant glassy phase and has a Rockwell 15N scale hardness reading in the range of about 84 to 87.

6. A composite powder according to claim 5 which contains, in addition, at least one material selected from the group consisting of $ZrO_2$ and CaO.

7. A composite powder according to claim 5, in which the $ZrO_2$ and CaO are present in amounts up to about 0.5%.